(12) United States Patent  (10) Patent No.: US 8,978,364 B2
Olivier et al.  (45) Date of Patent: Mar. 17, 2015

(54) REAGENT INJECTOR

(75) Inventors: Keith Olivier, Jackson, MI (US);
Thomas P. Mallin, Temperance, MI
(US); Matthew L. Roessle, Temperance,
MI (US); Rick Simpson, LaSalle, MI
(US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 279 days.

(21) Appl. No.: 13/465,281

(22) Filed: May 7, 2012

(65) Prior Publication Data

US 2013/0292498 A1 Nov. 7, 2013

(51) Int. Cl.
| | | |
|---|---|---|
| *F01N 3/00* | (2006.01) | |
| *F01N 3/10* | (2006.01) | |
| *B05B 9/00* | (2006.01) | |
| *B05B 1/30* | (2006.01) | |
| *F02M 51/00* | (2006.01) | |
| *F01N 3/20* | (2006.01) | |

(52) U.S. Cl.
CPC .............. *F01N 3/2066* (2013.01); *Y02T 10/24* (2013.01); *F01N 2610/02* (2013.01); *F01N 2610/1453* (2013.01)
USPC .................. 60/295; 60/301; 60/303; 239/124; 239/125; 239/584; 239/585.1; 239/585.5

(58) Field of Classification Search
CPC .............. B05B 1/30; B05B 1/32; B05B 1/34; B05B 1/3053; F01N 3/00; F01N 3/208; F01N 3/2066; F01N 2610/1453; F01N 2610/146
USPC ................. 239/585.1, 585.3, 585.5, 124–139, 239/533.14, 533.15, 533.2–533.4; 60/286, 60/295, 301, 303; 123/472, 476; 251/129.15–129.21
See application file for complete search history.

(56) References Cited

U.S. PATENT DOCUMENTS

| | | |
|---|---|---|
| 2,235,834 A | 3/1941 | Gillette Claude et al. |
| 3,927,984 A | 12/1975 | Hartley |
| 3,958,757 A | 5/1976 | Happel et al. |
| 4,179,069 A | 12/1979 | Knapp et al. |
| 4,215,820 A | 8/1980 | Renger |
| 4,292,947 A | 10/1981 | Tanasawa et al. |
| 4,499,878 A | 2/1985 | Igashira et al. |
| 4,610,080 A | 9/1986 | Hensley |
| 4,717,080 A | 1/1988 | Sauer |
| 4,726,523 A | 2/1988 | Kokubo et al. |

(Continued)

FOREIGN PATENT DOCUMENTS

| | | |
|---|---|---|
| DE | 2418227 | 10/1975 |
| DE | 2460111 | 7/1976 |

(Continued)

*Primary Examiner* — Len Tran
*Assistant Examiner* — Thomas Berez
(74) *Attorney, Agent, or Firm* — Harness, Dickey & Pierce, P.L.C.

(57) ABSTRACT

An injector for injecting a reagent into an exhaust stream includes an outer tube extending through an electromagnet and surrounding an inner tube. A first end of the inner tube is sealingly fixed to an inner surface of the outer tube. A guide member and an orifice plate are each sealingly fixed to the inner surface of the outer tube. A second end of the inner tube is aligned by the guide member. A moveable valve member includes a pintle head guided by the inner surface of the outer tube to align the valve member with an orifice extending through the orifice plate.

21 Claims, 6 Drawing Sheets

(56) References Cited

U.S. PATENT DOCUMENTS

| | | | |
|---|---|---|---|
| 4,742,964 A | 5/1988 | Ito et al. | |
| 4,805,837 A | 2/1989 | Brooks et al. | |
| 4,869,429 A | 9/1989 | Brooks et al. | |
| 4,887,769 A | 12/1989 | Okamoto et al. | |
| 4,938,455 A | 7/1990 | Grohmann | |
| 5,046,472 A * | 9/1991 | Linder | 123/533 |
| 5,060,868 A * | 10/1991 | Knapp et al. | 239/585.3 |
| 5,307,997 A | 5/1994 | Wakeman | |
| 5,522,218 A | 6/1996 | Lane et al. | |
| 5,570,841 A | 11/1996 | Pace et al. | |
| 5,605,042 A | 2/1997 | Stutzenberger | |
| 5,713,327 A | 2/1998 | Tilton et al. | |
| 5,857,478 A | 1/1999 | Davison et al. | |
| 5,884,611 A | 3/1999 | Tarr et al. | |
| 5,924,280 A | 7/1999 | Tarabulski | |
| 5,943,858 A | 8/1999 | Hofmann et al. | |
| 5,950,932 A | 9/1999 | Takeda et al. | |
| 5,976,475 A | 11/1999 | Peter-Hoblyn et al. | |
| 5,979,866 A | 11/1999 | Baxter et al. | |
| 6,041,594 A | 3/2000 | Brenner et al. | |
| 6,063,350 A | 5/2000 | Tarabulski et al. | |
| 6,164,322 A | 12/2000 | Najmolhoda et al. | |
| 6,168,098 B1 | 1/2001 | Brinn, Jr. | |
| 6,192,677 B1 | 2/2001 | Tost | |
| 6,257,496 B1 | 7/2001 | Wyant | |
| 6,273,120 B1 | 8/2001 | Hofmann et al. | |
| 6,279,603 B1 | 8/2001 | Czarnik et al. | |
| 6,293,097 B1 | 9/2001 | Wu et al. | |
| 6,382,533 B1 | 5/2002 | Mueller et al. | |
| 6,454,192 B2 | 9/2002 | Perry | |
| 6,470,676 B2 | 10/2002 | Dolling et al. | |
| 6,494,388 B1 | 12/2002 | Muellet et al. | |
| 6,526,746 B1 | 3/2003 | Wu et al. | |
| 6,539,708 B1 | 4/2003 | Hofmann et al. | |
| 6,708,904 B2 | 3/2004 | Itatsu | |
| 6,739,525 B2 | 5/2004 | Dantes et al. | |
| 6,742,330 B2 | 6/2004 | Genderen | |
| 6,877,680 B2 | 4/2005 | Bauer | |
| 6,922,987 B2 | 8/2005 | Mital et al. | |
| 6,988,681 B2 | 1/2006 | Reiter | |
| 7,021,558 B2 * | 4/2006 | Chenanda et al. | 239/125 |
| 7,100,366 B2 | 9/2006 | Hager et al. | |
| 7,237,731 B2 | 7/2007 | Dallmeyer et al. | |
| 7,299,997 B2 | 11/2007 | Sayar | |
| 7,306,172 B2 | 12/2007 | Sayar | |
| 7,311,273 B2 * | 12/2007 | Agneray et al. | 239/533.7 |
| 7,344,090 B2 | 3/2008 | Sayar | |
| 7,467,749 B2 | 12/2008 | Tarabulski et al. | |
| 7,770,823 B2 * | 8/2010 | Kubota et al. | 239/533.14 |
| 7,861,520 B2 | 1/2011 | Broderick et al. | |
| 8,024,922 B2 | 9/2011 | van Vuuren et al. | |
| 8,038,080 B2 | 10/2011 | Malck et al. | |
| 8,047,452 B2 | 11/2011 | Martin et al. | |
| 2002/0001554 A1 | 1/2002 | Czarnak et al. | |
| 2003/0222158 A1 * | 12/2003 | Boehland et al. | 239/533.2 |
| 2004/0041112 A1 | 3/2004 | Goossens et al. | |
| 2004/0187483 A1 | 9/2004 | Dalla Betta et al. | |
| 2006/0108443 A1 | 5/2006 | Huffman et al. | |
| 2007/0221748 A1 * | 9/2007 | Hornby et al. | 239/135 |
| 2008/0022663 A1 | 1/2008 | Dodge et al. | |
| 2008/0180200 A1 | 7/2008 | Gamble | |
| 2009/0064972 A1 * | 3/2009 | Abe et al. | 123/456 |
| 2009/0179087 A1 | 7/2009 | Martin et al. | |
| 2009/0301067 A1 | 12/2009 | Dingle et al. | |
| 2010/0192913 A1 * | 8/2010 | Keidel et al. | 123/470 |
| 2011/0025439 A1 | 2/2011 | Rettinger et al. | |
| 2011/0192140 A1 | 8/2011 | Olivier et al. | |

FOREIGN PATENT DOCUMENTS

| | | |
|---|---|---|
| DE | 10241697 | 4/2003 |
| EP | 1111231 | 6/2001 |
| EP | 1291498 | 3/2003 |
| EP | 2336544 | 6/2011 |
| EP | 1081487 | 1/2012 |
| JP | 60-040777 | 3/1985 |
| JP | 9-504591 | 5/1997 |
| JP | 11-166410 | 6/1999 |
| JP | 2001-342928 | 12/2001 |
| JP | 2002-525491 | 8/2002 |
| JP | 2003-083053 | 3/2003 |
| JP | 2003-328735 | 11/2003 |
| JP | 2004-176586 | 6/2004 |
| JP | 2010-247106 | 11/2004 |
| JP | 2005-201158 | 7/2005 |
| JP | 2006-226162 | 8/2006 |
| JP | 3888518 B2 | 3/2007 |
| JP | 2008-101564 | 5/2008 |
| WO | WO 2004029446 | 4/2004 |
| WO | WO 2005108753 | 11/2005 |

\* cited by examiner

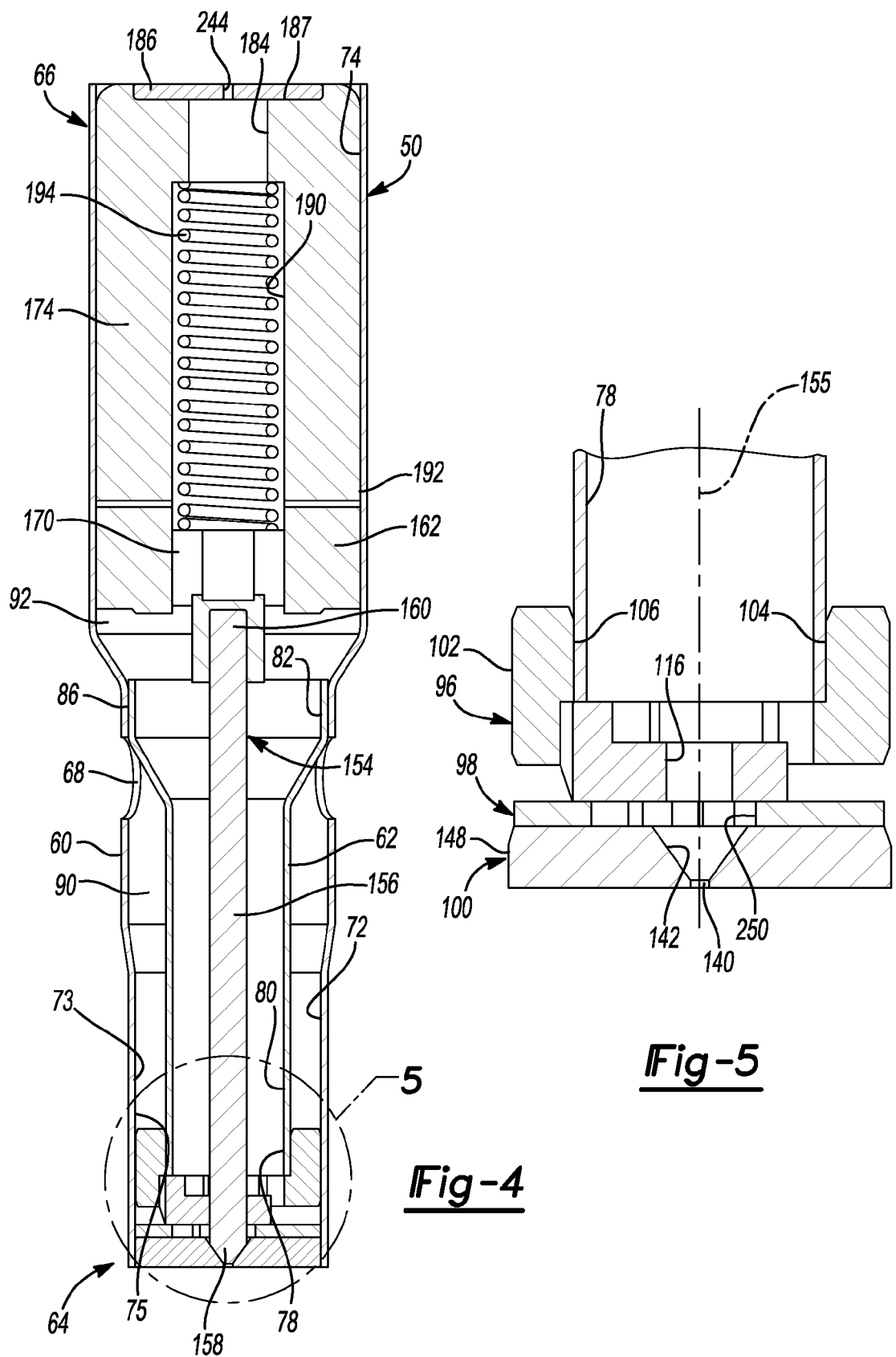

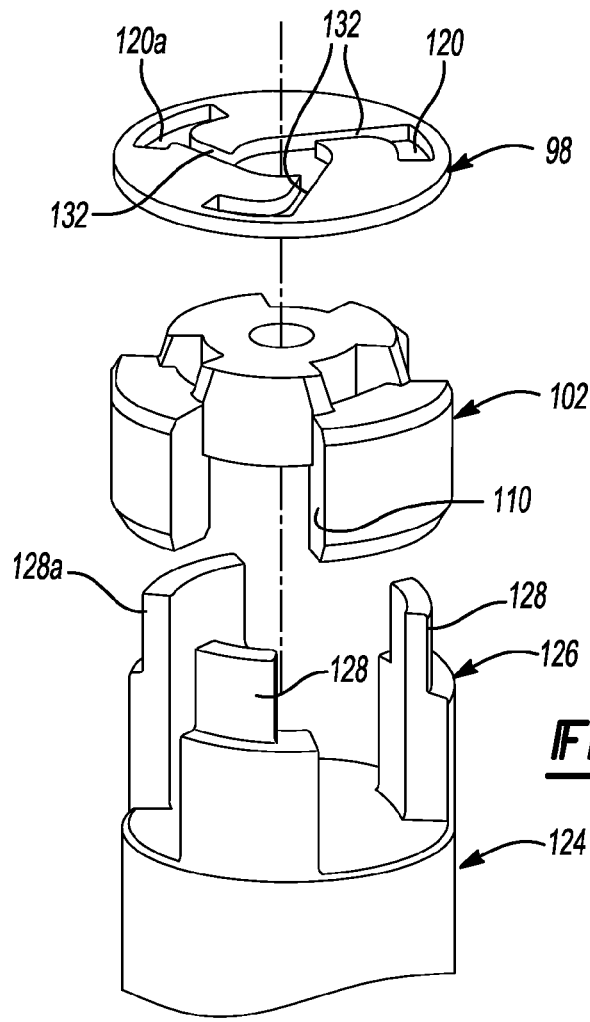
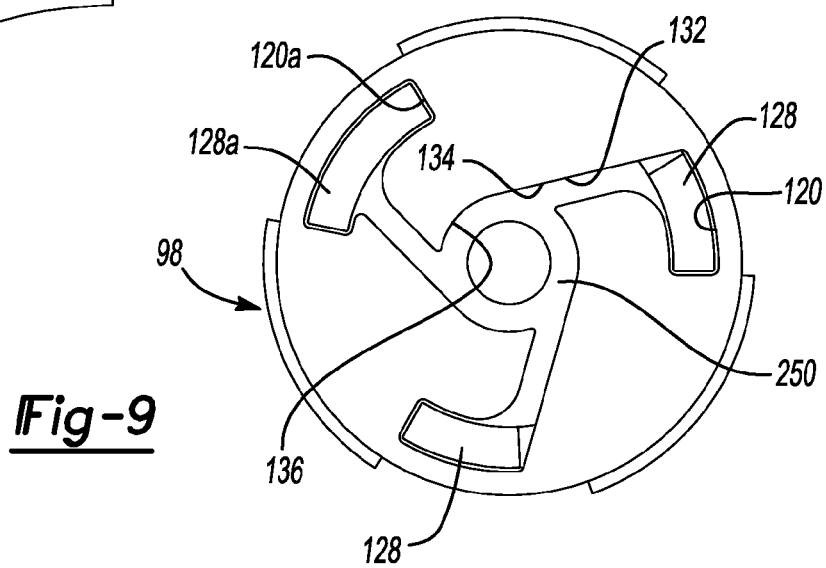

REAGENT INJECTOR

FIELD

The present disclosure relates to injector systems and, more particularly, relates to an injector system for injecting a reagent, such as an aqueous urea solution, into an exhaust stream to reduce oxides of nitrogen ($NO_x$) emissions from diesel engine exhaust.

BACKGROUND

This section provides background information related to the present disclosure which is not necessarily prior art. Lean burn engines provide improved fuel efficiency by operating with an excess of oxygen, that is, a quantity of oxygen that is greater than the amount necessary for complete combustion of the available fuel. Such engines are said to run "lean" or on a "lean mixture." However, this improved or increase in fuel economy, as opposed to non-lean burn combustion, is offset by undesired pollution emissions, specifically in the form of oxides of nitrogen ($NO_x$).

One method used to reduce $NO_x$ emissions from lean burn internal combustion engines is known as selective catalytic reduction (SCR). SCR, when used, for example, to reduce $NO_x$ emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust $NO_x$ mass flow. The reagent/exhaust gas mixture is passed through a reactor containing a catalyst, such as, for example, activated carbon, or metals, such as platinum, vanadium or tungsten, which are capable of reducing the $NO_x$ concentration in the presence of the reagent.

An aqueous urea solution is known to be an effective reagent in SCR systems for diesel engines. However, use of such an aqueous urea solution involves many disadvantages. Urea is highly corrosive and may adversely affect mechanical components of the SCR system, such as the injectors used to inject the urea mixture into the exhaust gas stream. Urea also may solidify upon prolonged exposure to high temperatures, such as temperatures encountered in diesel exhaust systems. Solidified urea will accumulate in the narrow passageways and exit orifice openings typically found in injectors. Solidified urea may also cause fouling of moving parts of the injector and clog any openings or urea flow passageways, thereby rendering the injector unusable.

Some reagent injection systems are configured to include a pump, a supply line and a return line such that aqueous urea is continuously pumped to minimize solidification and also transfer heat from the injector to the aqueous urea stored at a remote location. These injectors are typically equipped with an inlet coupled to the supply line and a spaced apart outlet coupled to the return line where both the inlet and the outlet are positioned on an opposite side of an electromagnet as the injector orifice. While injectors configured in this manner have functioned sufficiently in the past, concerns may arise regarding the pumped fluid interrupting the magnetic circuit and decreasing the efficiency of the solenoid. An increased current, coil diameter, wire diameter and/or number of coil turns may be required to account for the inefficient circuit.

Other concerns may arise regarding previously provided injectors regarding cost, complexity and leakage of the fluid to be pumped either through the injection orifice or some other joint between injector components. Accordingly, it may be desirable to provide an improved reagent injector addressing some or all of these concerns.

SUMMARY

This section provides a general summary of the disclosure, and is not a comprehensive disclosure of its full scope or all of its features.

An injector for injecting a reagent into an exhaust stream includes an outer tube extending through an electromagnet and surrounding an inner tube. A first end of the inner tube is sealingly fixed to an inner surface of the outer tube. A guide member and an orifice plate are each sealingly fixed to the inner surface of the outer tube. A second end of the inner tube is aligned by the guide member. A moveable valve member includes a pintle head guided by the inner surface of the outer tube to align the valve member with an orifice extending through the orifice plate.

An injector for injecting a reagent into an exhaust stream includes an electromagnet coupled to a housing. A slot disc includes a plurality of circumferentially spaced apart swirl ports extending therethrough. The slot disc also includes a swirl slot extending between each swirl port and terminating at a swirl chamber. Each swirl slot includes a substantially linear portion and a circular portion where the circular portions define an outer diameter of the swirl chamber. An orifice plate includes an orifice and is fixed to the slot disc. A valve member is moveable within the housing between a closed position where reagent is restricted from exiting the orifice and an open position where reagent is allowed to pass through the orifice based on an energization of the electromagnet. Reagent is pumped through the swirl ports, the swirl slots and the swirl chamber when the valve member is in the open position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is another cross-sectional view taken through a cartridge assembly of the injector depicted in FIGS. 2 and 3;

FIG. 5 is an enlarged fragmentary cross-sectional view of the injector;

FIG. 8 is a perspective view of an assembly tool with components of the injector; and FIG. 9 is a plan view of the components with the assembly tool.

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of $NO_x$ emissions, the present teachings may be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Pat. No. 8,047,452, issued Nov. 1, 2011, entitled "Method And Apparatus For Injecting Atomized Fluids", which is incorporated herein by reference.

Figure 1:
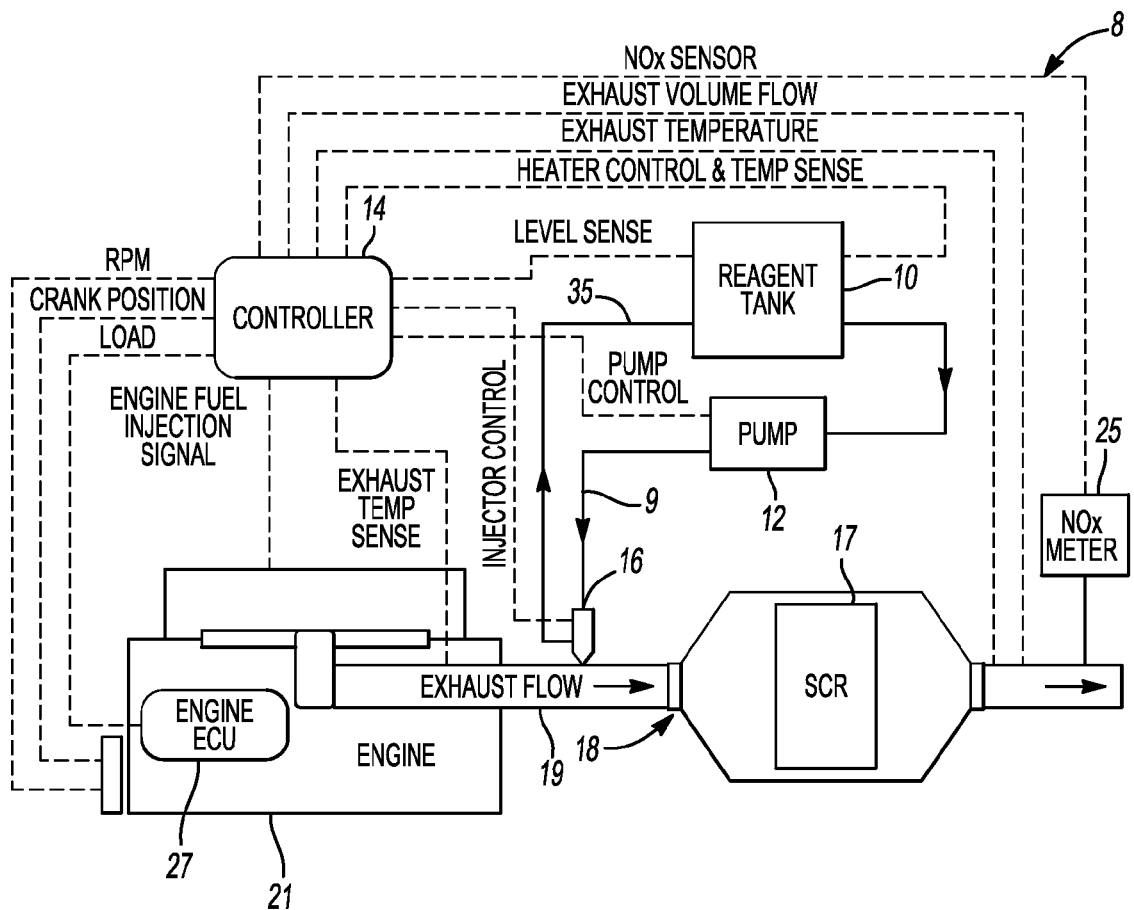
FIG. 1 is a schematic depicting an exemplary exhaust aftertreatment system including an electromagnetically controlled reagent injector constructed in accordance with the teachings of the present disclosure.
Figure 2:
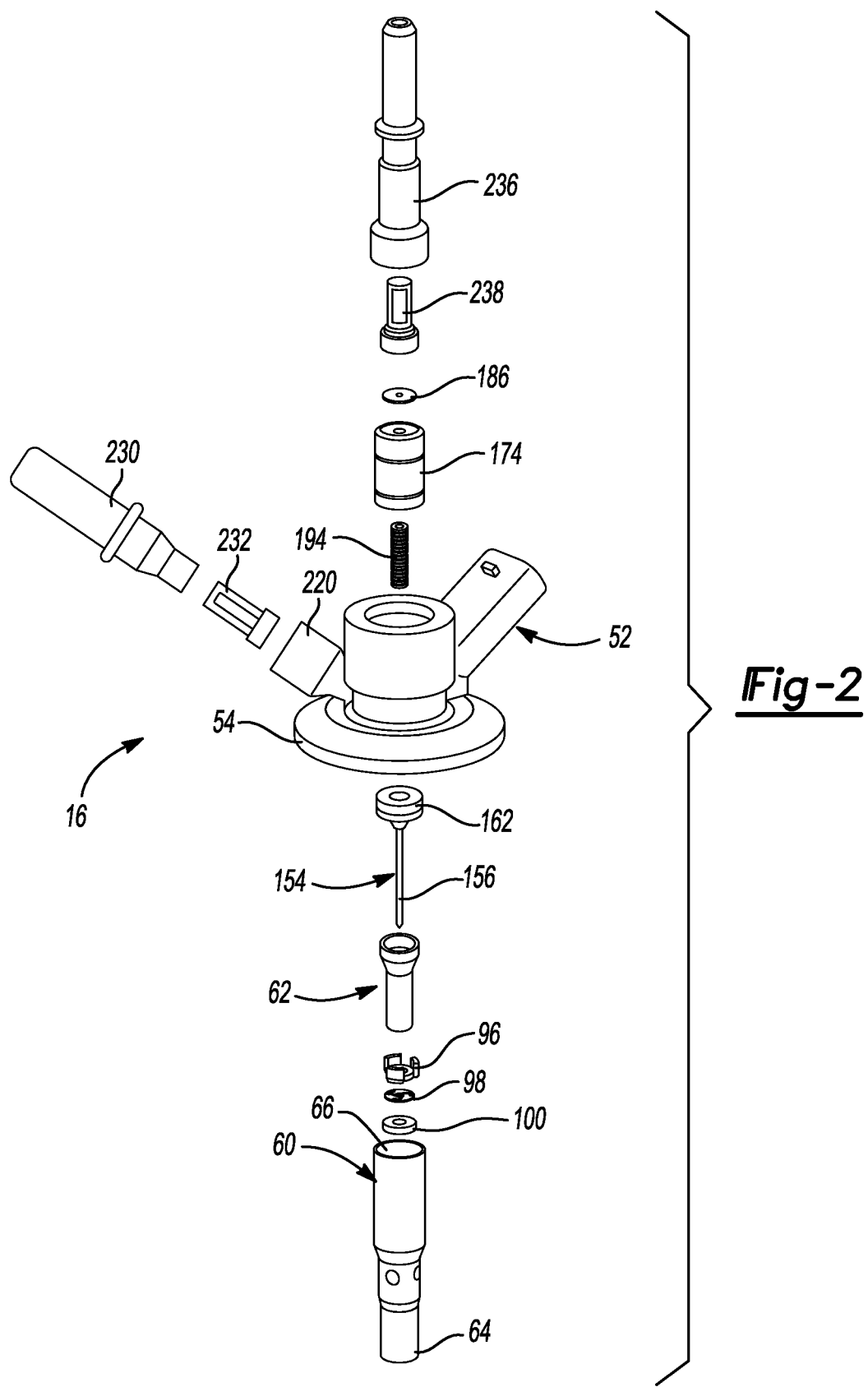
FIG. 2 is an exploded perspective view of the reagent injector.
Figure 3:
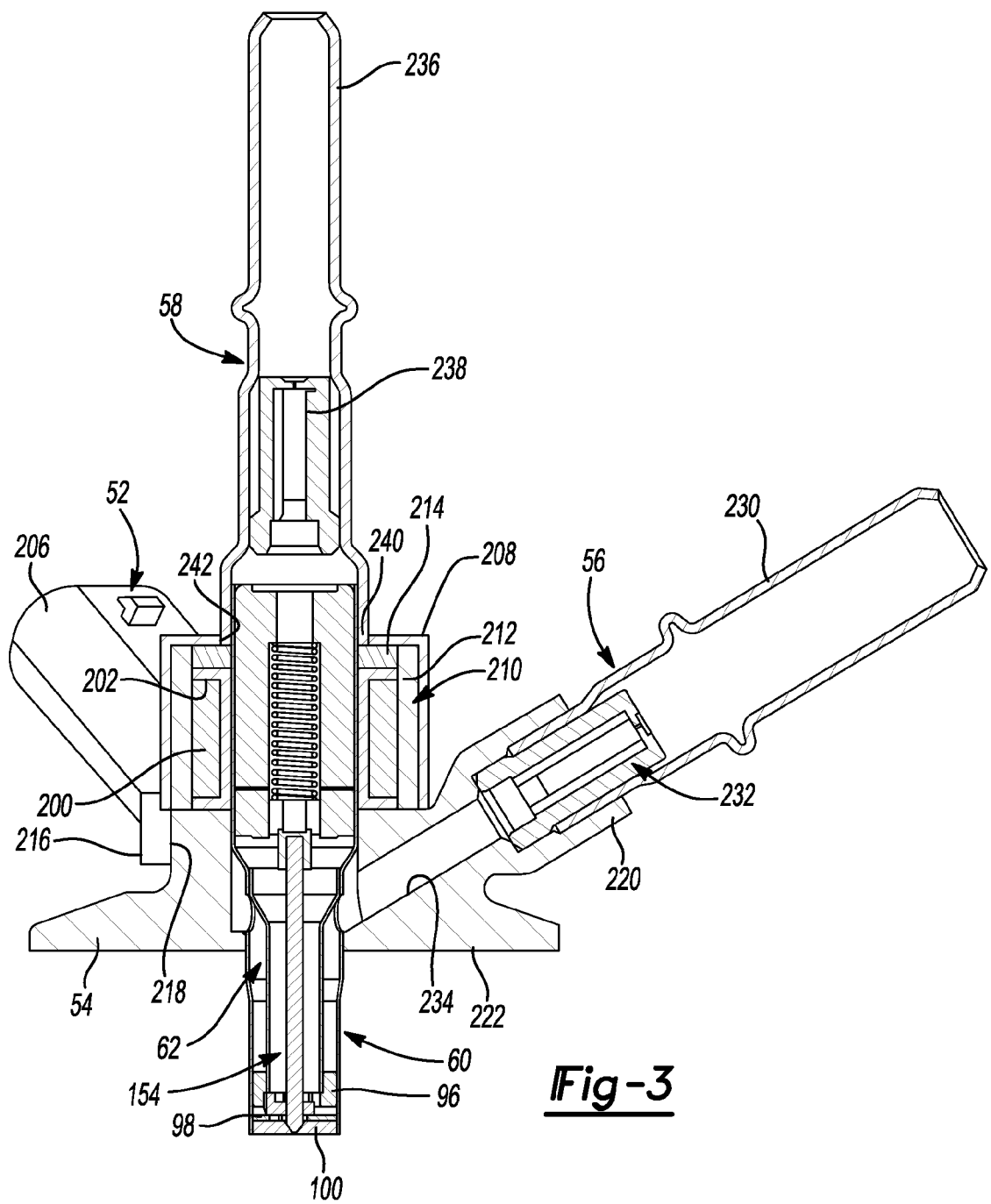
FIG. 3 is a cross-sectional view taken through the injector depicted in FIG. 2.
Figure 6:
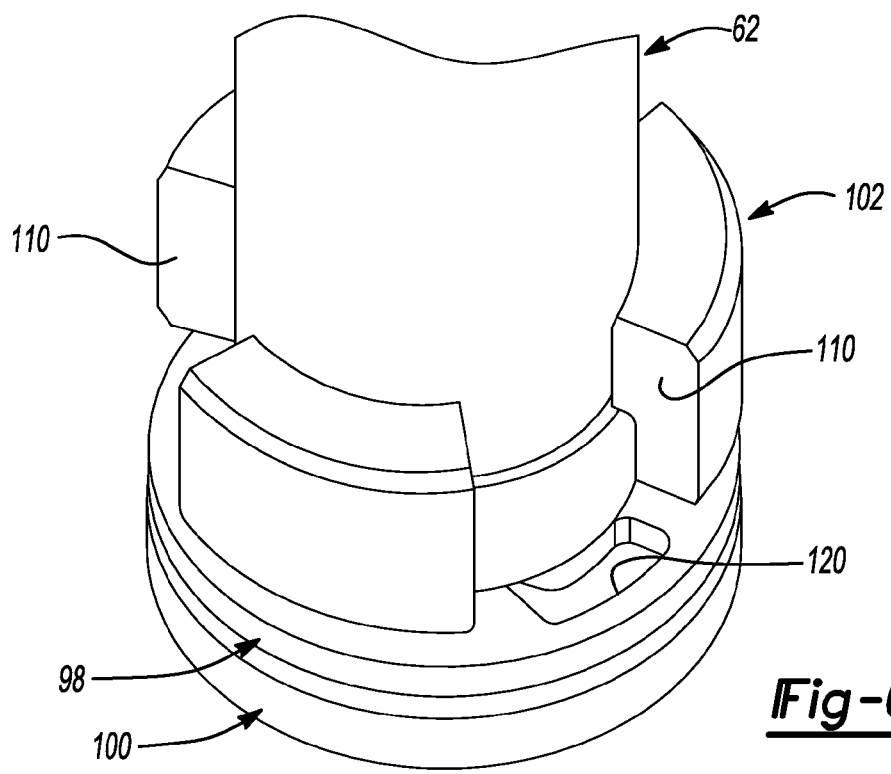
FIG. 6 is a fragmentary perspective view of a portion of the previously depicted injector.
Figure 7:
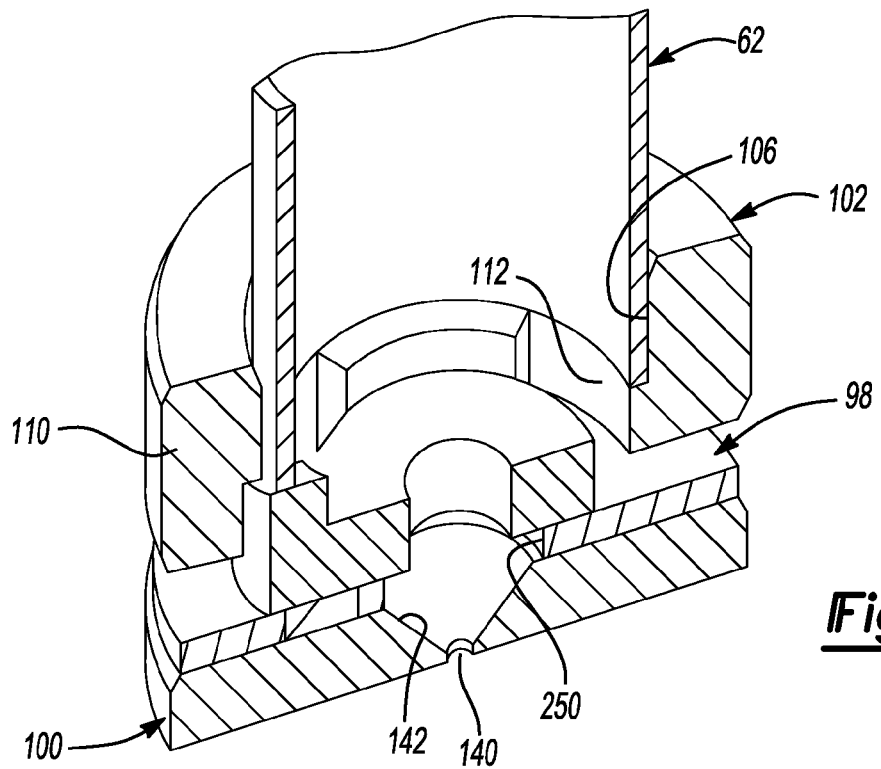
FIG. 7 is a fragmentary sectional perspective view of the injector.

With reference to the Figures, a pollution control system 8 for reducing $NO_x$ emissions from the exhaust of an internal combustion engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents may be available in the system and may be used singly or in combination. The tank 10 and delivery module 12 may form an integrated reagent tank/delivery module. Also provided as part of system 8 is an electronic injection controller 14, a reagent injector 16, and an exhaust system 18. Exhaust system 18 includes an exhaust conduit 19 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

With reference to FIGS. 2-7, reagent injector 16 will be further described. Reagent injector 16 includes a cartridge body assembly 50, an electromagnet assembly 52, a mounting plate 54, an inlet assembly 56, and an outlet assembly 58. Cartridge body assembly 50 includes a tubular outer body 60 fixed to a tubular inner body 62. Outer body 60 includes a first end 64 and an opposite second end 66. A plurality of circumferentially spaced apart apertures 68 extend through outer body 60. Outer body 60 includes an inner surface 72 defining a substantially cylindrical bore 73 having a reduced diameter portion 75. Outer body 60 also includes an enlarged diameter portion 74. Inner body 62 is a substantially hollow tube having a bore 78 including a first reduced diameter portion 80 and a second enlarged diameter portion 82. Enlarged diameter portion 82 is sized to closely fit within reduced diameter portion 75 of outer body 60. Inner body 62 is fixed to outer body 60 using a laser welding process. Laser weld 86 circumferentially extends to form a seal between inner body 62 and outer body 60 such that a lower chamber 90 is separated from an upper chamber 92. Lower chamber 90 forms a portion of a supply passage.

Cartridge assembly 50 also includes a lower guide 96, a slot disc 98, and an orifice plate 100. Lower guide 96 includes a substantially cylindrical outer surface 102 sized to closely fit within reduced diameter portion 75 of outer body 60. A bore 104 extends through lower guide 96 to allow fluid to pass therethrough. Bore 104 includes an enlarged diameter portion 106 sized to receive inner body 62. A plurality of inlet ports 110 are circumferentially spaced apart from one another extending through cylindrical outer surface 102 in communication with bore 104. A plurality of bypass ports 112 interconnect inlet ports 110 with bore 78 of inner body 62. Bore 104 also includes a guide portion 116. It is contemplated that lower guide 96 is metal injection molded from a material such as 17-4 MIM.

Slot disc 98 may be constructed from a plate or a sheet of material having a closely controlled thickness. Slot disc 98 may be constructed from 304 stainless steel and include a plurality of stamped or laser cut slots 120. Alternatively, slot disc 98 may be metal injection molded from 17-4 MIM. Slots 120 are arcuately shaped and circumferentially spaced apart from one another. Slots 120 are oriented to be in fluid communication with inlet ports 110. To assure this orientation, one of slots 120 identified as 120a circumferentially extends a greater arc length than the other slots. This asymmetrical feature is used in combination with an assembly tool 124, depicted in FIGS. 8 and 9, to assure that slot disc 98 is fixed to lower guide 96 at a desired orientation. Assembly tool 124 includes a plurality of circumferentially spaced apart posts 126 each including a tang 128 extending therefrom. One tang, identified as tang 128a circumferentially extends a greater arc length than the other tangs 128. To assemble lower guide 96 and slot disc 98, lower guide 96 is placed within assembly tool 124. Subsequently, slot disc 98 is oriented to align slot 120a with tang 128a to allow slot disc 98 to engage lower guide 96. Subsequently, electron beam welding fixes slot disc 98 to lower guide 96. A subassembly of lower guide 96 and slot disc 98 may be used for assembly of cartridge assembly 50.

Slot disc 98 includes a plurality of swirl slots 132 in fluid communication with slots 120. Each of swirl slots 132 includes a substantially linear portion 134 and a circular portion 136. Swirl slots 132 impart a swirling motion to injected reagent passing through inlet ports 110 and slots 120.

Orifice plate 100 includes an orifice 140 coaxially aligned with a conical valve seat 142. Circular portions 136 of swirl slots 132 define a circle that is coaxially aligned with orifice 140 and conical valve seat 142. Orifice plate 100 includes an outer cylindrical surface 148 that is sized to closely fit with reduced diameter portion 75 of outer body 60. Orifice plate 100 is fixed to outer body 60 using an electron beam welding process that sealingly couples orifice plate 100 to outer body 60.

A valve member 154 is slidably positioned within enlarged portion 74 of bore 73. Valve member 154 includes an elongated pintle 156 having a conically shaped first end 158 and an opposite second end 160. First end 158 is selectively engageable with valve seat 142 of orifice plate 100 to define a sealed and closed position of valve member 154 when seated. An unsealed, open position exists when pintle 156 is spaced apart from valve seat 142. Valve seat 142 may be conically or cone-shaped as shown to complement the conical first end 158 of pintle 156 to restrict the flow of reagent through orifice 140. Depending on the application and operating environment, pintle 156 and orifice plate 100 may be made from a carbide material, which may provide desired performance characteristics and may be more easily and cost-effectively manufactured. Carbide may provide additional advantages, such as insensitivity to brazing temperatures that may range from 870-980° C., as opposed to carbon steels, which may distemper. Carbide may also provide an increased surface hardness when compared to the hardness achievable with most other steels. Carbide may also be advantageous with regard to overall wear resistance. Orifice plate 100 may alternatively be constructed from a precipitation hardened material, CPM S90V or 440C stainless steel.

A pintle head 162 is fixed to second end 160 of pintle 156. Pintle head 162 is slidably positioned within enlarged portion 74 of bore 73 and includes a plurality of circumferentially spaced apart apertures 170 extending therethrough. A running-class slip fit between pintle head 162 and inner surface 72 provides an upper guide for valve member 154 to translate along an injection axis 155. A lower valve member guide is formed at the sliding interface between pintle 156 and guide portion 116 of lower guide 96. Based on the provision of inner surface 72 as a datum for orifice plate 100, lower guide 96, and pintle head 162, valve member 154 is accurately aligned with valve seat 142 and orifice 140.

A pole piece 174 is sized to be received within bore 73. Pole piece 174 is fixed to outer body 60 using a process such as electron beam welding or laser welding. Elongated pole piece 174 includes a central bore 184 extending therethrough. Central bore 184 is coaxially aligned with bore 73. A restrictor plate 186 is positioned within a pocket 187 of pole piece 174. A counterbore 190 inwardly extends from an end 192 of pole piece 174. A compression spring 194 is positioned within counterbore 190 in biased engagement with pintle head 162 to urge valve member 154 into engagement with valve seat 142.

Electromagnet assembly 52 includes a coil of wire 200 wrapped around a bobbin 202. Pintle head 162 is constructed from a magnetic material such as 430 stainless steel such that electrical energization of coil 200 produces a magnetic field urging pintle head 162 toward pole piece 174. When coil 200 is energized, first end 158 of pintle 156 becomes disengaged from valve seat 142 to allow reagent to flow through orifice 140. Power may be provided to coil 200 via access to a receptacle 206 of an overmolded housing 208, for example, in response to a signal from electronic injection controller 14.

A flux frame 210 includes a tube 212 surrounding bobbin 202 and coil 200. An end cap 214 extends from tube 212 to an outer surface of outer body 60. Mounting plate 54 provides the remaining portion of flux frame 210. Mounting plate 54, however, is not a portion of an overmolded subassembly including coil 200, bobbin 202, tube 212, end cap 214, receptacle 206 and overmolded housing 208. Housing 208 includes a tang 216 sized and shaped for receipt within a key way 218 of mounting plate 54. A relative angular orientation between receptacle 206 and an inlet boss 220 of mounting plate 54 is assured once tang 216 resides within key way 218.

Cartridge assembly 50 extends through electromagnet assembly 52 as well as mounting plate 54. Outer body 60 is laser welded to mounting plate 54 proximate a mounting plane 222 of mounting plate 54 as well as at a location proximate pintle head 162. The laser welds extend uninterruptedly 360 degrees to form a seal between mounting plate 54 and outer body 60. No additional elastomeric seals are required.

Inlet assembly 56 includes a 300 series stainless steel tube 230 and an inlet filter 232. Inlet tube 230 is fixed to boss 220 of mounting plate 54 by a process such as laser welding. Inlet tube 230 is in fluid communication with an inlet passageway 234 extending through mounting plate 54. Inlet passageway 234 is in fluid communication with each of apertures 68 extending through outer body 60 and chamber 90 or supply passage 90.

Outlet assembly 58 includes a 300 series stainless steel outlet tube 236 and an outlet filter 238. Outlet tube 236 includes a first end 240 sized to be received within a pocket 242 formed in overmolded housing 208. Outlet tube 236 is laser welded to outer body 60 to retain electromagnet assembly 52 between outlet assembly 58 and mounting plate 54. Outlet tube 236 is in fluid communication with central bore 184 of pole piece 174.

A closed loop reagent fluid path is provided when pintle 156 of reagent injector 16 is in the closed position. Reagent is provided from reagent tank 10 via delivery module 12 to inlet tube 230. Reagent passes through inlet filter 232, inlet passageway 234 and aperture 68 to enter supply passage or lower chamber 90. Reagent continues to flow through inlet ports 110 and bypass ports 112 to enter a return passage or bore 78 of inner body 62. Pressurized reagent continues to flow through apertures 170 of pintle head 162 and central bore 184 of pole piece 174. Restrictor plate 186 includes an aperture 244 through which the return flow rate of reagent is controlled. Outlet tube 236 is in receipt of the reagent returning to tank 10. When reagent is not being injected into the exhaust system, the reagent is continuously pumped to flow through lower guide 96 and transfer heat from orifice plate 100 to the reagent stored in tank 10.

When electromagnet assembly 52 is energized, pintle 156 is moved from valve seat 142. Pressurized reagent in communication with slots 120 flows through each of swirl slots 132 to enter a swirl chamber 250 defined by circular portions 136, lower guide 96, pintle 156 and orifice plate 100. Based on the pressure differential between orifice 140 and swirl slots 132, as well as the tangential relationship of swirl slots 132 to swirl chamber 250, a rapidly moving circular reagent motion is induced. The lower pressure at orifice 140, combined with the pressurized reagent moving in a swirling fashion, creates a finely atomized spray exiting orifice 140. Reagent that does not exit orifice 140 continues to be recirculated as previously described.

It should be appreciated that it may be desirable to vary the spray angle at which reagent exits orifice 140. It has been discovered that by changing the diameter of the circle defined by circular portions 136 and therefore the diameter of swirl chamber 250, the total included angle of the reagent spray exiting orifice 140 may also be varied. For example, the number of slots, slot width, and plate thickness can be varied to achieve a desired spray angle. As such, a family of injectors may be provided having each of the same components with the exception of a different slot disc having geometry tailored to produce the desired spray angle. In comparison with machining relatively complex injection components, providing a family of different slot discs is inexpensive and simple.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An injector for injecting a reagent into an exhaust stream, comprising:
    an electromagnet;
    an inner tube;
    an outer tube extending through the electromagnet and surrounding the inner tube, a first end of the inner tube being circumferentially sealingly fixed to an inner surface of the outer tube;
    a guide member and an orifice plate each being sealingly fixed to the inner surface of the outer tube, wherein a second end of the inner tube is aligned by the guide member; and
    a moveable valve member including a pintle head guided by the inner surface of the outer tube to align the valve member with an orifice extending through the orifice plate.

2. The injector of claim 1, further including a pole piece positioned adjacent to the pintle head and fixed to the inner surface of the outer tube.

3. The injector of claim 2, wherein the pole piece includes a bore in receipt of a spring biasing the pintle head away from the pole piece.

4. The injector of claim 1, wherein the electromagnet includes a coil of wire wrapped around a bobbin, a flux frame surrounding the wire and a plastic housing encapsulating the wire, bobbin and flux frame.

5. The injector of claim 1, wherein the outer tube includes an aperture in receipt of the reagent, the aperture being axially located between the electromagnet and the orifice.

6. The injector of claim 5, wherein the inner tube and the outer tube at least partially define a supply passage through which reagent flows.

7. The injector of claim 6, further including a return passage extending through the pintle head and the pole piece to allow recirculation of the reagent.

8. The injector of claim 7, further including a slot disc positioned between the orifice plate and the guide member, the slot disc including a swirl port extending therethrough, wherein the guide member includes an inlet port aligned with the swirl port to provide fluid communication between the supply passage and the orifice.

9. The injector of claim 8, wherein the guide member includes a bypass port providing fluid communication between the supply passage and the return passage.

10. The injector of claim 9, wherein the slot disc includes a plurality of circumferentially spaced apart swirl ports and a corresponding plurality of swirl slots extending from the swirl ports and terminating at a swirl chamber.

11. The injector of claim 10, wherein each swirl slot includes a substantially linear portion and a circular portion, the circular portions defining an outer diameter of the swirl chamber.

12. The injector of claim 1, further including a mount positioned on a first side of the electromagnet and an outlet tube positioned on an opposite second side of the electromagnet, the mount and the outlet tube being fixed to the outer tube to retain the electromagnet between the mount and the outlet tube.

13. The injector of claim 12, wherein the outer tube and the mount are sealingly fixed to each other at separate axially spaced apart locations to restrict pressurized reagent from leaking from the injector.

14. The injector of claim 13, wherein the mount forms a portion of a flux frame surrounding the electromagnet.

15. An injector for injecting a reagent into an exhaust stream, comprising:
    a housing;
    an electromagnet coupled to the housing;
    a slot disc including a plurality of circumferentially spaced apart swirl ports extending therethrough, the slot disc also including a swirl slot extending between each swirl port and terminating at a swirl chamber, wherein each swirl slot includes a substantially linear portion and a circular portion, the circular portions defining an outer diameter of the swirl chamber;
    an orifice plate including an orifice and being fixed to the slot disc;
    a valve member moveable within the housing between a closed position where reagent is restricted from exiting the orifice and an open position where reagent is allowed to pass through the orifice based on an energization of the electromagnet, wherein reagent is pumped through the swirl ports, the swirl slots and the swirl chamber when the valve member is in the open position, wherein the housing includes an outer tube extending through the electromagnet and an inner tube positioned inside the outer tube; and
    a mount positioned on a first side of the electromagnet and an outlet tube positioned on an opposite second side of the electromagnet, the mount including a radially outwardly extending flange and an integrally formed inlet passage, the injector including an aperture extending through the outer tube positioned in fluid communication with the inlet passage.

16. The injector of claim 15, wherein a first portion of the inner tube is fixed to the outer tube and a second portion of the inner tube is spaced apart from the outer tube defining a reagent supply passage.

17. The injector of claim 16, wherein the electromagnet includes a coil of wire wrapped around a bobbin, a flux frame surrounding the wire and a plastic housing encapsulating the wire, bobbin and flux frame.

18. The injector of claim 17, wherein the mount and the outlet tube are fixed to the outer tube to retain the electromagnet between the mount and the outlet tube.

19. The injector of claim 15, further including a pole piece positioned adjacent to the valve member and fixed to the outer tube, and a return passage extending through the valve member and the pole piece to allow recirculation of the reagent.

20. The injector of claim 19, further including a guide member including a bypass port providing fluid communication between the supply passage and the return passage.

21. The injector of claim 20, wherein the outer tube and the mount are sealingly fixed to each other at separate axially spaced apart locations to restrict pressurized reagent from leaking from the injector.

\* \* \* \* \*